United States Patent
Spall et al.

(10) Patent No.: US 6,622,199 B1
(45) Date of Patent: Sep. 16, 2003

(54) METHOD FOR MINIMIZING DATA RELOCATION OVERHEAD IN FLASH BASED FILE SYSTEMS

(75) Inventors: Lee Young Spall, San Diego, CA (US); James A. Hutchison, IV, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/347,244

(22) Filed: Jul. 2, 1999

(51) Int. Cl.[7] .......................... G06F 12/00; G06F 12/12
(52) U.S. Cl. ........................................ 711/103; 711/166
(58) Field of Search ................................ 711/103, 156, 711/163, 165, 166, 171

(56) References Cited

U.S. PATENT DOCUMENTS

| | | | |
|---|---|---|---|
| 5,581,723 A | * 12/1996 | Hasbun et al. | 711/103 |
| 5,838,614 A | * 11/1998 | Estakhri et al. | 365/185.11 |
| 6,000,006 A | * 12/1999 | Bruce et al. | 711/103 |
| 6,038,636 A | * 3/2000 | Brown et al. | 711/103 |
| 6,202,138 B1 | * 3/2001 | Estakhri et al. | 711/168 |

* cited by examiner

*Primary Examiner*—Matthew Kim
*Assistant Examiner*—Matthew D. Anderson
(74) *Attorney, Agent, or Firm*—George Pappas; Charles Brown; Philip Wadsworth

(57) ABSTRACT

A method for allocating blocks within sectored EEPROM (commonly referred to as flash memory) based memory to minimize data relocation overhead and maximize sectored EEPROM lifetime. Data to be saved within sectored EEPROM is configured into data pages or blocks representing the minimum data size that is relocated within the sectored EEPROM in any given erase cycle. Multiple data blocks are contained within a single sector. A sector represents the minimum data size that is erased from the sectored EEPROM in any single erase cycle. Each block has a corresponding calculated value of volatility and new or updated data blocks to be added to the file are saved in sectored EEPROM according to a hierarchy based upon the calculated volatility of the data block. Data blocks with a calculated volatility within a predetermined threshold of the average volatility of a sector are saved within the most occupied sector containing no obsolete blocks. If no such sector exists then the data block is saved in the first available empty sector. If no empty sectors are available the data is saved in the sector containing the fewest obsolete blocks provided the volatility of the data is within a predetermined threshold of the average sector volatility. If such sector does not exist then the data is saved in the sector with the fewest obsolete blocks.

13 Claims, 6 Drawing Sheets

US 6,622,199 B1

METHOD FOR MINIMIZING DATA RELOCATION OVERHEAD IN FLASH BASED FILE SYSTEMS

BACKGROUND OF THE INVENTION

I. Field of the Invention

The present invention relates to electronic memory. More particularly, the present invention relates to a novel and improved method for minimizing data relocation overhead in systems utilizing sectored EEPROM based files.

II. Description of the Related Art

Electronic memory of some type is used in almost all modern electronic devices. Electronic memory can take the form of floppy discs, magnetic tape, hard discs, and integrated chips (IC). Each form of memory has its advantages and disadvantages. Floppy discs allow numerous data updates on a portable medium but have limited capacity and long read and write access times. Both magnetic tape and hard discs have the capability for enormous capacity but are not portable, require large amounts of support hardware, and have slow read and write access times. IC memory is typically used where memory needs to be integrated into a portable device. Varying the type and number of ICs can scale the amount of memory. ICs require minimum support hardware, are extremely small, and can provide fast read and write access times.

Numerous different types of IC memory are available to provide solutions to various design requirements. Each type of memory is able to satisfy a number of design requirements, but no one memory type is able to provide a complete design solution. The type of memory chosen for any particular application will depend on planned usage and performance design trade-offs.

The most common type of IC memory is Read Only Memory (ROM). As the name implies, the memory is only read accessible. A ROM device cannot be written to once it has been programmed. Embedded software applications use ROM to store embedded code and look up tables. The processor in an embedded software application retrieves each instruction from ROM and executes it. Different types of ROM are available depending on the volatility of the information to be programmed within the ROM. If the information to be stored in ROM is not expected to change and the expected volume of devices is high then mask programmable ROM is used. This type of ROM is mask programmed prior to packaging of the die. The information to be programmed must be highly stable and not subject to revision since changes in the programmed information require a mask change. The benefits of using mask programmed ROM relate to cost and time savings for high volume, mature products. Other types of ROM are available for products that do not sustain production volumes or code stability sufficient to justify mask programmed ROM.

Programmable Read Only Memory (PROM) allows the device manufacturer to program the embedded code. This allows for revisions in the code but still does not allow for modification or erasure of the ROM once it has been programmed. Devices that have been programmed with an out of date code revision will either need to be used with the out of date code revision or will need to be discarded.

Erasable Programmable Read Only Memory (EPROM) provides the ability to completely erase a programmed part. Erasure of an EPROM is accomplished by exposing the die to ultraviolet (UV) light for a predetermined period of time. The die can be exposed to the UV light through a transparent window on the EPROM package. Once erased, the EPROM can be reprogrammed. EPROMs are typically only used for engineering development where the expected number of code revisions is high. The limitations on the package type that can accommodate the transparent window contribute to the much higher price of an EPROM when compared to a PROM. Although the EPROM can be erased and reprogrammed, modifications to the code must be done on a complete chip basis. Even changes to a single bit within the code require complete erasure and reprogramming. This limitation, along with the requirement for a UV light for erasure confine the task of updating EPROMs to original equipment manufacturers (OEMs).

A device that allows for selective content erasure and reprogramming is the Electrically Erasable Programmable Read Only Memory (EEPROM). Conventional EEPROM allows for data to be updated in place. That is, a particular data location can be erased and new data overwritten in the same location. Data can be read from an EEPROM quickly but the write cycle of the conventional EEPROM can be orders of magnitude longer than the read time. Another disadvantage of using a conventional EEPROM arises from the inherent structure of the conventional EEPROM cell. The structure of a conventional EEPROM cell requires more transistors than in a standard PROM. The increased structure results in reduced memory capacity and increased cost. These disadvantages make usage of conventional EEPROM prohibitive in most consumer electronics applications.

Random Access Memory (RAM) represents one alternate means for storage. RAM allows for selective data reads and writes. Read and write can be performed on a byte basis. No erase cycle is required before writing new data to a previously written byte. Moreover, unlike the EEPROM, the read and write cycle times of the RAM are nearly identical. The density and capacity of RAM is comparable to ROM. The major disadvantage in using RAM is the volatile nature of the stored data. Information stored in RAM is lost whenever the RAM powers down. This is in contrast to ROM, which is nonvolatile memory, where the contents of memory remain even after the IC has been power cycled. In order to retain the contents of RAM, power must be maintained on the chip at all times. This requires a battery back up to the normal power supply. If the battery back up fails when the power supply is de-energized the contents of RAM will be lost. For this reason RAM is not used for embedded code and is used only for dynamic memory. RAM used for embedded code would be susceptible to loss of battery power and power supply glitches. Furthermore, if RAM were used for embedded code, battery operated devices such as cellular telephones would have diminished battery life due to the constant power requirements of the RAM. When RAM is used for dynamic memory the system does not care if the contents are lost after a power cycle. This alleviates the need for battery back up.

Another storage alternative is sectored EEPROM commonly referred to as flash memory. Sectored EEPROM is a nonvolatile storage device that allows read and write on a byte basis. Unlike RAM, in sectored EEPROM an erase operation must be performed before rewriting over a previously written byte. However, data erasure cannot be performed on a byte basis. Erasure can only be performed on a sector basis, where the size of the sector is defined by the particular memory device chosen. The size of an erasable sector is always larger than one byte and can be on the order of 64 kbytes. However, the number of erase cycles is not unlimited, but is bounded by a maximum cycle life. A typical recommended erase cycle life for sectored EEPROM is 100,000 cycles. Therefore, one would not use sectored EEPROM for applications requiring greater than 100,000 erase cycles over the anticipated device lifetime. Sectored EEPROM has advantages over the other types of rewriteable memory in applications that require fewer than 100,000 erase and rewrite cycles. Sectored EEPROM is preferred over any type of RAM for embedded code applications because sectored EEPROM is nonvolatile. Sectored EEPROM is preferable over EPROM because of sectored EEPROM's ability to rewrite portions of memory in circuit. Sectored EEPROM also does not require the UV light for chip erasure. Additionally, sectored EEPROM is preferable over conventional EEPROM, which has similar rewrite limitations, because of the lower cost and higher density of sectored EEPROM devices.

Because of the advantages of sectored EEPROM over other types of memory, sectored EEPROM is typically used for embedded code space storage in portable battery operated devices such as cellular telephones. Manufacturer programmed user specific data, such as phone ESN, service provider information, and phone number are also stored within sectored EEPROM. Other user specific data may be saved in sectored EEPROM if the expected number of update cycles does not exceed the maximum cycle life of the sectored EEPROM device. Other persistent data in the form of system data, data transmitted to wireless phones over the air, and user entered data may also require storage in nonvolatile memory. If persistent data is to be mapped to sectored EEPROM space, the expected updates over the lifetime of the unit must be relatively low and an efficient method of sectored EEPROM allocation for the new and updated data needs to be developed.

SUMMARY OF THE INVENTION

The present invention is a novel and improved method of allocating and updating data in sectored EEPROM. The method dynamically assigns data blocks within sectored EEPROM to minimize data relocation overhead when erasing portions of sectored EEPROM.

When a particular sectored EEPROM device is chosen for an application its manufacturer data sheet will define a sector as the minimum erasable size. A page or block of data is defined as the minimum relocatable data size for the information that is to be saved in sectored EEPROM. The size of a page or block must be less than the size of a sector but must be equal or greater than one byte. Ideally, a page size is defined to be large enough to define a control information portion and a data portion. The data portion of the block contains the actual file information. The control information portion contains information identifying the block as well as a block version number and a block relocation count. The block version number is a record of the number of times the particular block has been updated since its creation. The minimum value of the block version number is one, which signifies the contents of the block as the original data written to that location. The block relocation count is a record of the number of times a block has been relocated to allow a sector erase operation. The minimum value of the block relocation count is zero, which signifies the data in the block has never been relocated to allow a sector erase. A block volatility number is then calculated using the block version number and the block relocation count. (Note: Volatility used in this context relates to the dynamic quality of the data and does not refer to the memory's ability to retain its contents after power cycle.) If block volatility is defined as v: v=(block version number+ initial offset)/(block relocation count+1) Initial offset refers to a predetermined parameter controlling a block's initial assigned volatility. An arithmetic average of all the block volatility numbers within each sector is calculated to achieve a sector average. When an erase cycle for a particular sector is initiated the sector will contain a mixture of valid and obsolete blocks. The valid blocks must be relocated to other locations in sectored EEPROM prior to the erase cycle or else they will be lost. The valid data blocks are relocated according to a relocation hierarchy. The hierarchy is determined using the calculated volatility of the valid memory block to be relocated, the average sector volatility, and the contents of the sector. When the block is relocated it is written to the lowest addressed block within the sector satisfying the relocation hierarchy. For each block to be relocated a volatility metric is calculated as | average sector volatility—v|. First in the hierarchy is the most occupied sector containing no obsolete blocks where the volatility metric is less than a predetermined threshold. Next highest in the relocation hierarchy is the first available empty sector, followed by the sector containing the fewest obsolete blocks where the volatility metric is less than the predetermined threshold. Finally, if none of the other locations is available, the block is relocated to the sector containing the fewest obsolete blocks.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Sectored EEPROM allows for inexpensive means for nonvolatile storage of data and allows for the data to be erased and rewritten. However, unlike RAM, sectored EEPROM does not allow data to be updated "in place". Sectored EEPROM only allows for erasure of contents in predetermined sectors of data space. The size of erasable sectors is larger than the minimum data write size. As a result of the disparity in the minimum write and erase sizes a method must be incorporated to relocate valid blocks of data from sectors containing obsolete blocks, i.e. from sectors to be erased to sectors that will not presently be erased. Once valid blocks of data have been relocated, the memory space defined by the sector containing the obsolete data can be reclaimed through an erase cycle.

The criteria for determining when a sector erase operation is required are based upon the contents of the sector. An erase operation can be required when the number of obsolete blocks within the sector exceeds some predetermined threshold. Alternatively, an erase operation can be required when the ratio of obsolete blocks to valid blocks exceeds some number.

In order to guarantee that valid blocks will not be lost due to an erase operation, there must be sufficient memory space to relocate the valid memory blocks. In the present invention free memory space equal to the size of one sector must always be available in sectored EEPROM space to guarantee that valid blocks can be relocated prior to an erase operation. The free memory space need not be contiguous but may be distributed across all EEPROM sectors.

The blocks that must be relocated prior to an erase cycle contribute to processing overhead that must be accomplished prior to an erase cycle. Blocks that are constant and that seldom require updating ideally should be grouped together in the same sector. Segregating constant data from relatively dynamic data reduces the overhead prior to sector erasure. The classification of data as constant or dynamic and the subsequent segregation into different sectors of sectored EEPROM can be accomplished by analysis of the data prior to writing it into the sectored EEPROM. However, the analysis requires a manual interpretation of the relative permanence of data. This cannot easily be performed for persistent data. The present invention is a method for segregating constant data from dynamic data as an integral part of the block relocation process. As data is revised, the present invention segregates blocks of data according to their level of volatility thereby reducing relocation overhead for subsequent erase cycles.

Figure 1:
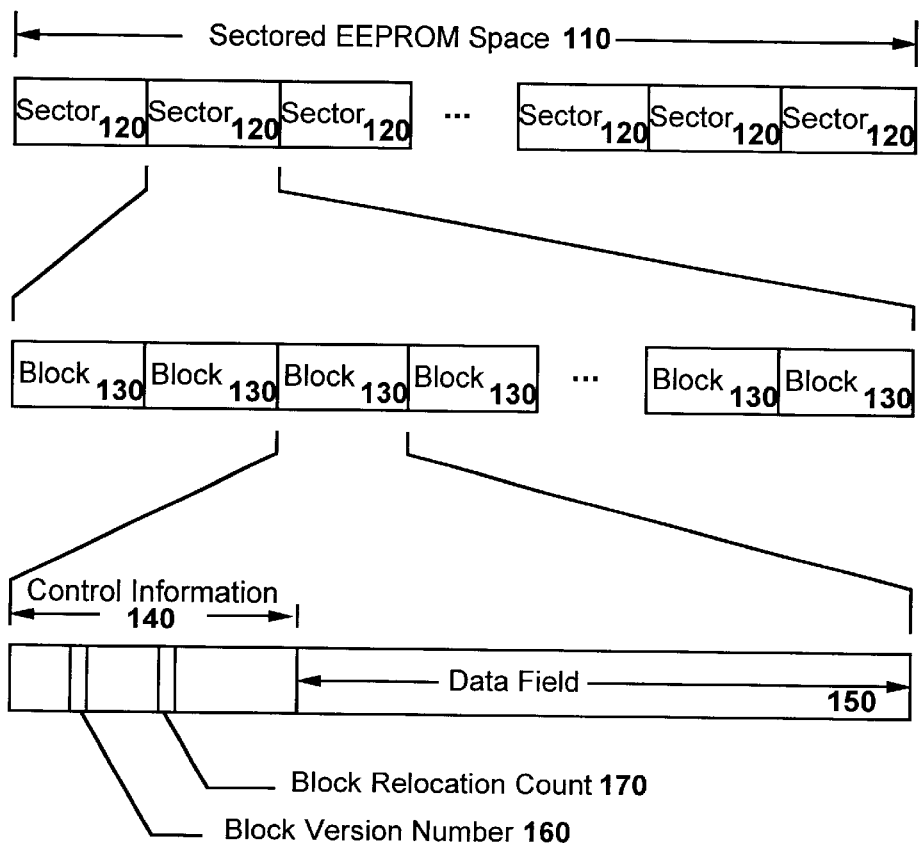
FIG. 1 is a block diagram showing the allocation of sectored EEPROM into sectors and blocks.

FIG. 1 shows the complete sectored EEPROM space 110 as one continuous memory space. A typical memory map for a microprocessor based system allocates a contiguous section of memory as sectored EEPROM space. The microprocessor addresses the sectored EEPROM as one contiguous memory section although in actuality it may be composed of multiple sectored EEPROM ICs. The sectored EEPROM space 110 is made up of numerous sectors 120. The sector 120 size depends on the actual sectored EEPROM IC chosen and is defined by the memory manufacturer. Each sector 120 represents a minimum erasable portion of sectored EEPROM 110. Each sector 120, in turn, is composed of a number of pages or blocks 130. The block 130 size is preferably set to the device page size, which is determined by the actual sectored EEPROM device chosen. In the preferred embodiment, all file accesses and data relocation operations are constrained to block sized segments. Each block 130 contains a control information 140 field and a data field 150. The control information 140 contains identifying information for the block 130. One element of the control information 140 is a block version number 160. The block version number 160 records the number of times a block 130 has been updated since its creation. The block version number 160 is set to one when data is initially programmed into the block 130. The control information 140 also includes a block relocation count 170. The block relocation count 170 records the number of times a block 130 has been relocated to allow a sector 120 erase operation. The block relocation count 170 is initialized at zero when the data is first written to the block 130. The block relocation count 170 then increments each time the block 130 is relocated to allow for an erase operation. From the block version number 160 and the block relocation count 170 a block volatility value can be calculated. The block volatility value is calculated as follows:

$$v = (\text{block version number} + \text{initial offset})/(\text{block relocation count} + 1)$$

Initial offset is a predetermined parameter controlling a block's initial assigned volatility. For example, both embedded code and persistent data may reside in sectored EEPROM. Embedded code delivered in a product is inherently stable whereas persistent data may be highly volatile. To indicate the presumed volatility of the persistent data an initial offset of ten may be associated with the portions of sectored EEPROM mapped to persistent data while an initial offset of zero may be associated with the portion of sectored EEPROM mapped to embedded code.

Figure 2:
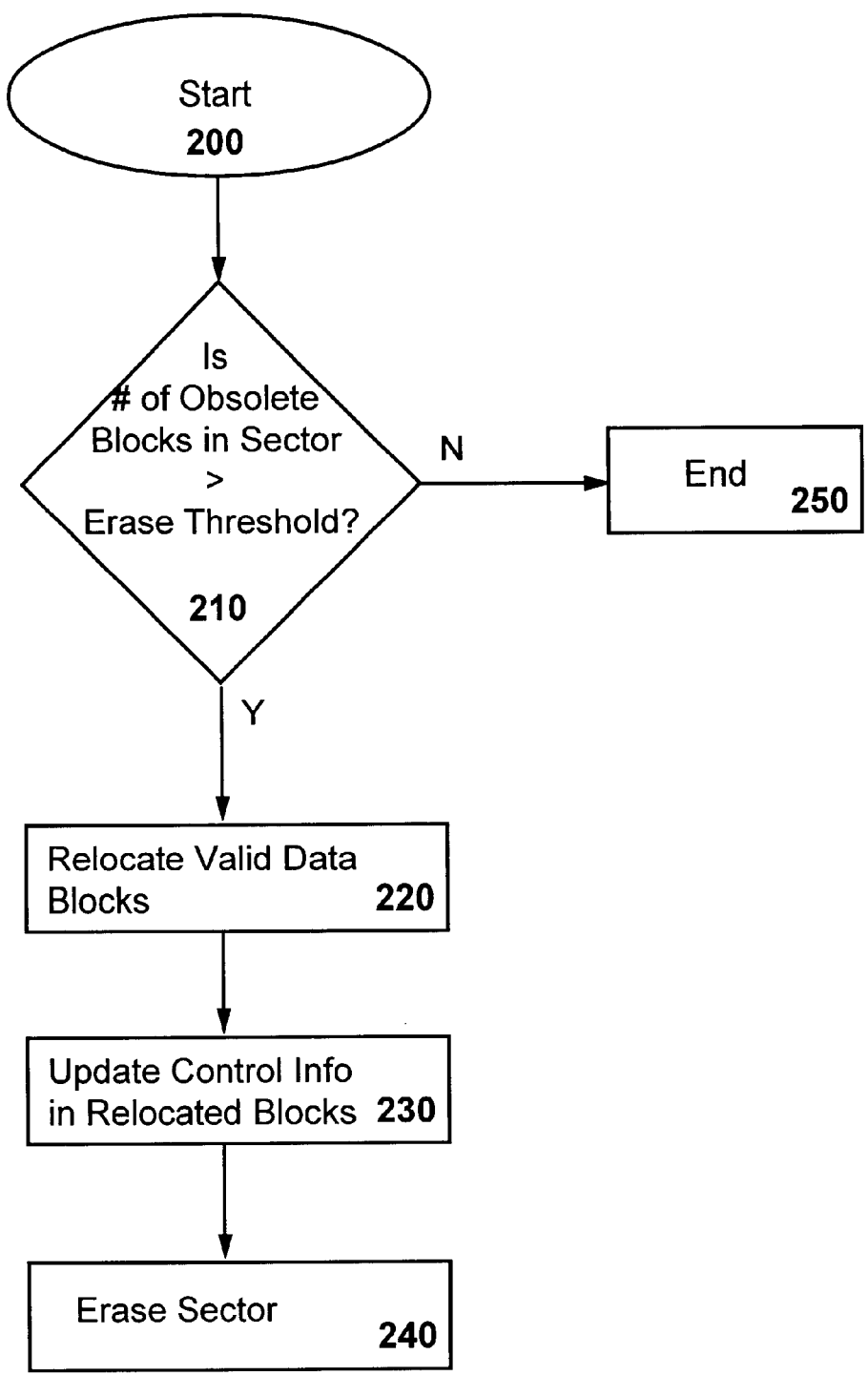
FIG. 2 is a flow chart showing the process of sector reclamation in sectored EEPROM.

Each time data is revised in sectored EEPROM 110, thereby obsoleting data currently stored in memory, there must be a check of the sector 120 containing the newly obsoleted data to see if an erase operation needs to be performed. Referring to FIG. 2 this is performed in step 210 by comparing the number of obsolete blocks in a sector with a predetermined erase threshold. If the erase threshold has not been exceeded no erase operation is initiated and the routine ends 250. Once the erase threshold has been exceeded all valid data blocks need to be relocated, step 220. Additionally, the control information on the relocated blocks needs to be updated such that the data blocks will be properly segregated in future relocation operations, step 230. Once the valid data blocks have been relocated and their control information has been updated a hardware erase cycle of the sector can be initiated, step 240. After the sector has been erased all bytes in the sector will be set to the preprogrammed state, typically FFh. The sector is then available for new data.

Figure 3A:
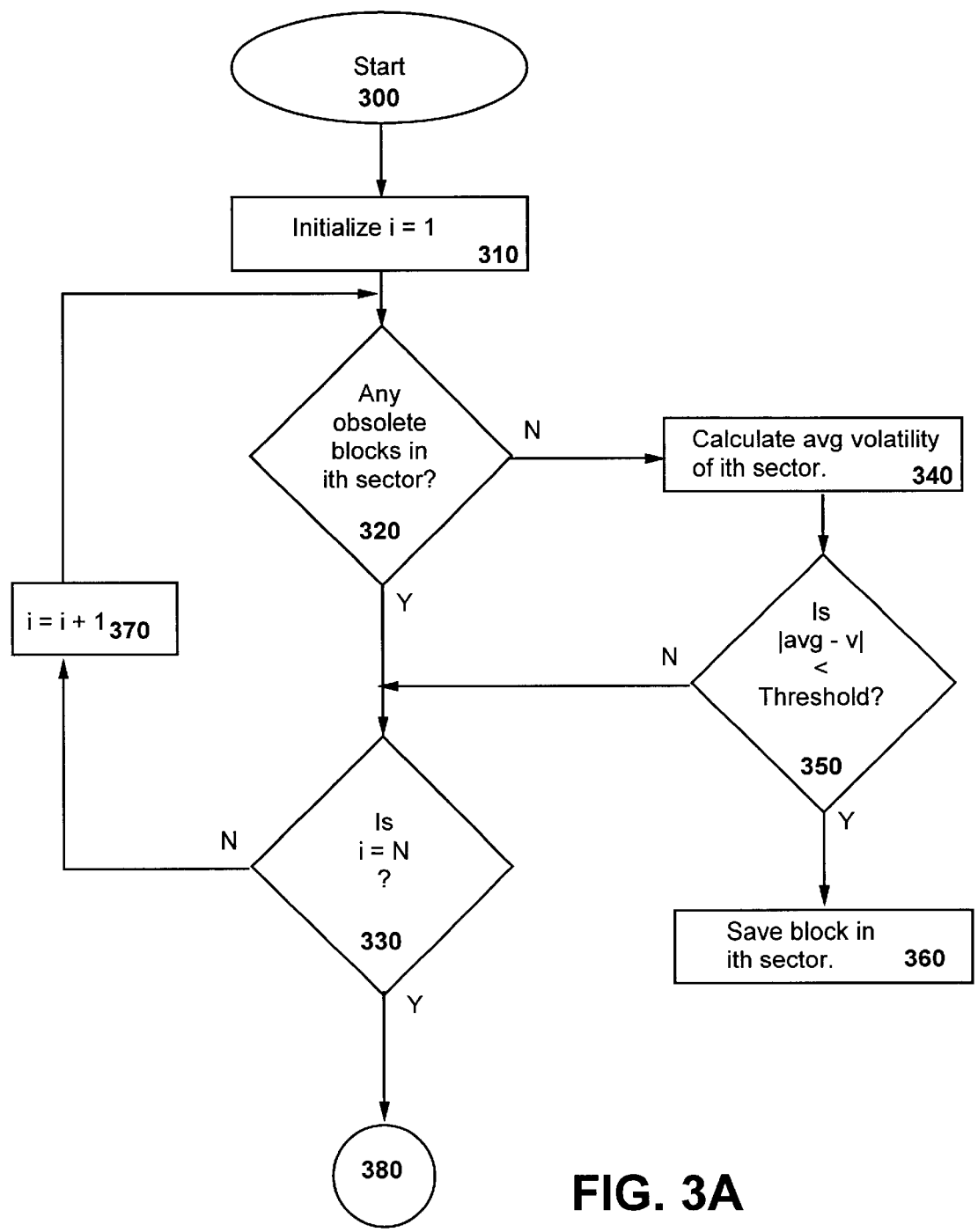
FIGS. 3A–3D are flow charts detailing the block relocation method.

The step of relocating valid data blocks, 220, is illustrated in the flow charts of FIGS. 3A–3D. Referring to FIG. 3A once the system has determined that an erase operation is to be performed the system starts the relocation routine 300. FIG. 3A represents the most preferable placement of the relocated block. The relocation routine determines in which sector to place valid blocks copied from the sector to be erased. The routine first initializes the sector counter, i, to one, step 310. The routine then proceeds to decision block 320 where the routine checks to see if there are any obsolete blocks in the ith sector. If there are no obsolete blocks within the sector the routine proceeds to step 340 where the average volatility of the sector is calculated. From the discussion above, the volatility (v) of each block can be calculated from the block version number and the block relocation count stored in the control information for each block. The average sector volatility (avg) can be calculated by averaging the volatility, v, of each block within the sector. The routine next proceeds to step 350 where a volatility metric is calculated based upon the average sector volatility and the volatility of the block to be relocated. The volatility metric is equal to |avg−v| and represents the mathematical distance between the volatility of the block to be relocated and the average volatility of the current sector being examined. Decision step 350 compares the value of the volatility metric with a predetermined threshold, e.g. two. If the volatility metric is less than the predetermined threshold then the volatility of the block to be relocated is similar to the volatility of the blocks already within the sector. This is the preferred situation since one of the objects of relocating data is to segregate data with like levels of volatility. If the volatility metric is less than the predetermined threshold the routine proceeds to step 360 where the block is relocated to the lowest addressed block in the sector. However, if the volatility metric is not less than the predetermined threshold there is not a good match between the block volatility and the average of the volatility of the blocks within the sector. If this is the case, the routine advances to step 330.

The routine advances to step 330 if either there are obsolete blocks in the sector or the volatility metric is not less than the predetermined threshold. In step 330 the routine compares the value of the sector counter i with N, the total number of sectors in sectored EEPROM space. If the sector counter has not yet reached the end of the sectored EEPROM space then the routine increments the sector counter, step 370. The routine then returns to step 320 to check the next sector using the same relocation criteria. However, if at step 330 the sector counter has reached the end of sectored EEPROM space the routine advances to point 380 which links FIG. 3A to FIG. 3B. The routine has checked all sectored EEPROM sectors against the first relocation criteria and has not found a suitable sector. The routine next applies a second relocation test shown in the flow chart of FIG. 3B.

Figure 3B:
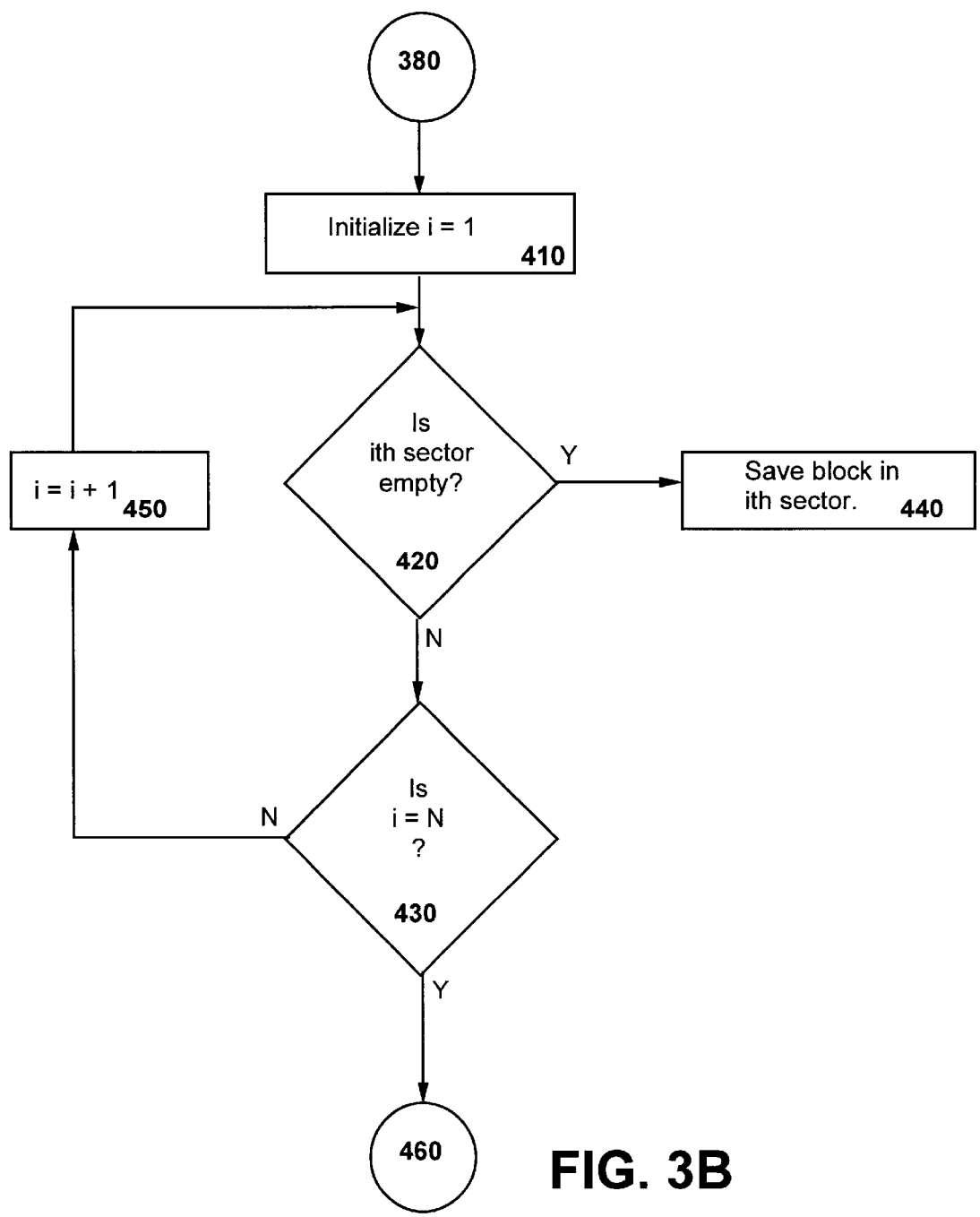

Referring to FIG. 3B, the routine proceeds from point 380, which joins FIG. 3A to FIG. 3B, to step 410. FIG. 3B details the attempt to relocate the block in the first available empty sector. In step 410 the sector counter is reinitialized to one. Then in step 420 the relocation routine checks to see if the present sector is empty. An empty sector may occur for one of two reasons. Either the sector is empty because no data has ever been written to that sector or the sector was recently erased and has yet to have any new data written to it. If the sector is found to be empty then the block is relocated to the empty sector, step 440. If the sector is not empty the routine proceeds to decision block 430 and compares the sector counter with N, the total number of sectors in sectored EEPROM space. If the sector counter has not reached the end of sectored EEPROM space the routine increments the sector counter, step 450. The relocation routine then returns to step 420 to check to see if the next sector is empty. If the sector counter has reached the end of sectored EEPROM space then it was unable to relocate the block in an empty sector. The relocation routine then proceeds to point 460, which links FIG. 3B to FIG. 3C, to perform the next relocation test.

Figure 3C:
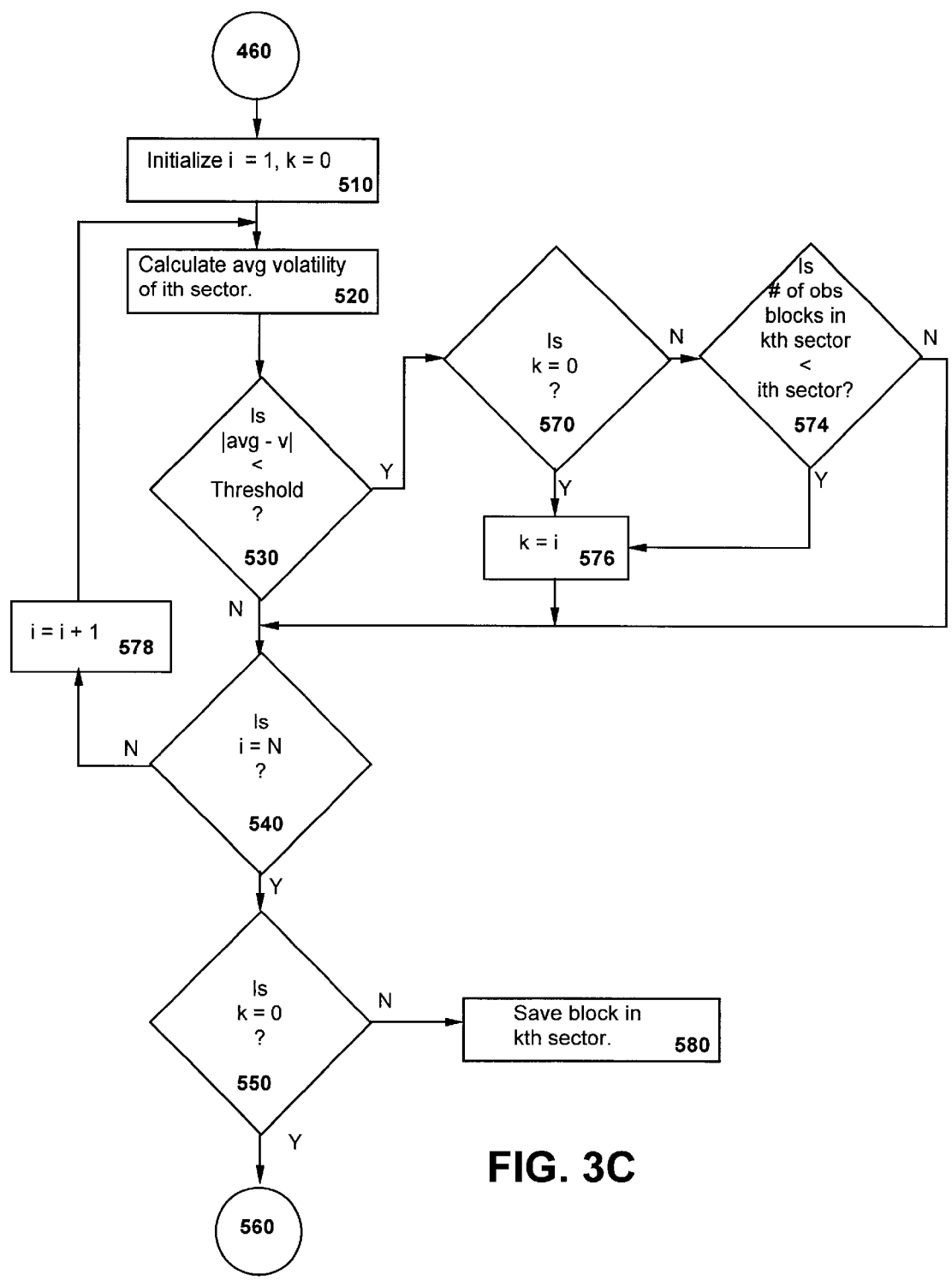

FIG. 3C details the attempt to relocate the block into the sector having the fewest obsolete blocks and having a volatility metric below a predetermined threshold. Inherently, any sector satisfying these criteria cannot also be the same sector as the sector being erased. From point 460 the relocation routine proceeds to step 510 where the sector count is reinitialized to one and a sector identifier (k) is initialized to zero. The sector identifier is used to record the number of the sector with a volatility metric below the threshold and that has the fewest obsolete blocks. From step 510 the relocation routine proceeds to step 520 where the average volatility of the ith sector is calculated. This calculation is performed in the same manner that the average volatility was calculated in step 340. The volatility (v) of each block in the sector is calculated from the block version number and block relocation count stored in the control information of the block. Then the average of the block volatility is calculated to achieve the average sector volatility. In step 530 the volatility metric is calculated using the average sector volatility and the volatility of the block to be relocated. The volatility metric is then compared against a predetermined threshold. This is similar to the process of step 350. Although the threshold used in step 530 need not be the same as the threshold used in step 350 it is convenient to use the same threshold. The purpose of establishing a threshold is to align blocks with like volatility numbers into the same sector. There is no pressing need to either relax or tighten the volatility criteria used in step 350. Therefore, a threshold value of two could be used in step 530. If the volatility metric is less than the threshold then the volatility of the block to be relocated is similar to the volatility numbers of the blocks currently residing in the sector.

The routine next determines whether the current sector is the one containing the least number of obsolete blocks. The relocated block is preferably placed in the sector containing the fewest obsolete blocks in order to minimize overhead in future erase cycles. Sectors containing many obsolete blocks are more likely to be erased than are sectors containing few obsolete blocks. Writing valid data to sectors with numerous obsolete blocks increases the probability that those valid blocks will need to be relocated again in a subsequent erase cycle. To locate the sector containing the fewest obsolete blocks the routine first checks to see if the sector identifier (k) is zero, step 570. If the sector identifier is zero this indicates that no prior sectors have had volatility metrics below the threshold. As such there is no need to compare the number of obsolete blocks in the present sector with any other sector since no other sectors have yet been found that satisfy the first prong of the relocation test of FIG. 3C. If k=0 then the routine assigns the current sector number to k, step 576 and advances to step 540 to check to see if all sectors have been tested as suitable candidates for relocation of the current block using the criteria of FIG. 3C.

However, if in step 570 it is determined that k is not zero, then there is at least one sector that has satisfied the other prong of the relocation test of FIG. 3C. The routine next determines whether the previously flagged sector has fewer obsolete blocks than the currently identified sector, step 574. If the previously identified sector, the kth sector, contains fewer obsolete blocks than the currently identified sector, the ith, sector, then the kth sector is preferable over the ith sector. If this is the case then the number identifying the kth sector is not updated. The routine advances to step 540 to check to see if all sectors have been tested. If, at step 574, the routine determines the ith sector contains fewer obsolete blocks than the kth sector the ith sector is the preferred candidate for the relocation of the current block. To record this preference the value of k is updated to the current value of i, step 576. The routine then advances to step 540 to see if all sectors have been tested.

If the relocation routine at step 530 determines that the sector volatility metric is greater than the threshold, or if steps 574 or 576 direct the relocation routine, the routine proceeds to step 540. At step 540 the relocation routine checks to see if the sector counter (i) is equal to N, the total number of available sectors in sectored EEPROM space. If i is not equal to N then there are still sectors to be tested. The routine increments the sector counter, step 578, and returns to step 520 to test the next sector. On the other hand, if i has reached N, all sectors have been tested using the criteria of FIG. 3C. The routine advances to step 550 to determine if a sector was identified as suitable for the relocation of the block.

In step 550 the routine checks the value of k, the sector identifier, to see if it is zero. If the value of k is nonzero, the routine has identified a sector that is suitable for the relocation of the block. If a suitable sector has been identified the routine proceeds to step 580 where the block is saved in the lowest addressed block of the kth sector. If the value of k is zero then no sectors have been identified as suitable for block relocation under the criteria of FIG. 3C. If no sectors have been identified as suitable, the routine proceeds to point 560, which links FIG. 3C to FIG. 3D, in order to relocate the block according to the next criteria.

Figure 3D:
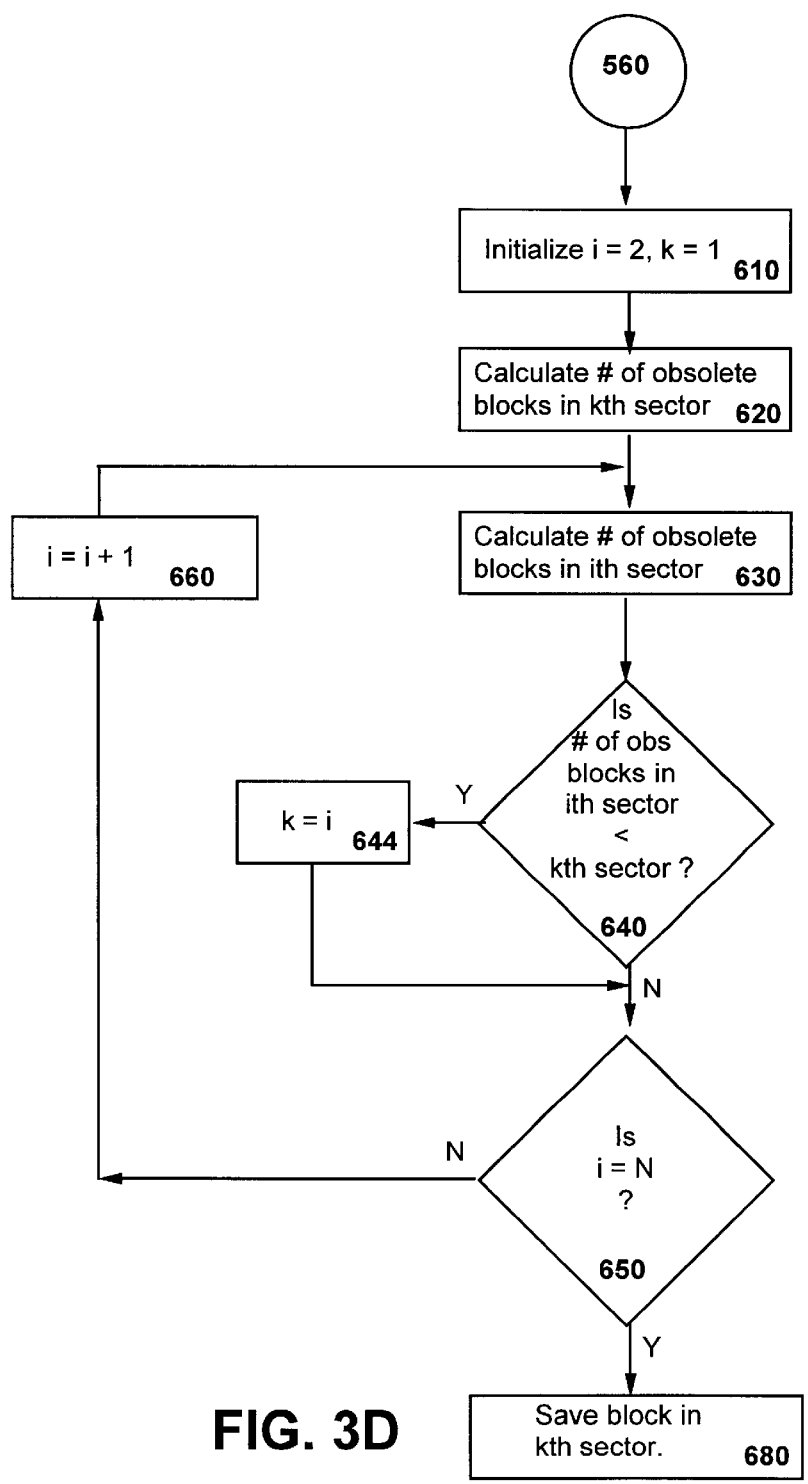

Point 560 links the flow chart of FIG. 3C to the flow chart of FIG. 3D. Referring to FIG. 3D, if the routine has reached this flow chart then all preferable criteria for relocating the block have failed yet the block still must be relocated. FIG. 3D as the default placement routine will necessarily relocate any block that is presented to it. The default relocation of a block will position the block in the lowest addressed block in the sector containing the fewest obsolete blocks.

However, in no case will a block be relocated to the same sector that is to be erased.

From point 560, the routine proceeds to step 610 where the sector counter (i) is initialized to two and the sector identifier (k) is initialized to one. Then in step 620 the number of obsolete blocks in the kth sector is calculated. Since this is the first sector that is being examined, the sector by default contains the lowest number of obsolete blocks of any sector examined. Next, at step 630, the routine calculates the number of obsolete blocks in the ith sector. Recall that i is initialized at the value of two. In step 640 the routine determines whether the number of obsolete blocks is fewer in the kth or ith sector. If the ith sector contains fewer obsolete blocks it is preferred over a sector containing a greater number of obsolete blocks. Therefore the value of the sector identifier (k) is updated to record the current value of i, step 644.

If the number of obsolete blocks in the kth sector is fewer than the number of obsolete blocks in the ith sector, step 640, or after the value of k has been updated to the value of i, step 644, the routine proceeds to step 650 to determine whether or not all of the sectors in sectored EEPROM space have been tested. This is performed by comparing the current sector counter value with N, the value of the total number of sectors in sectored EEPROM space, step 650. If all sectors in sectored EEPROM space have not yet been tested, the routine increments the value of the sector counter, step 660, and returns to step 630 to test the next sector. Once all sectors have been tested the routine advances to step 680 where the block is saved in the lowest free address space in the kth sector. The kth sector represents the sector having the fewest obsolete blocks.

In summary, the current invention is a method for relocating memory blocks in sectored EEPROM in anticipation of an erase operation such that blocks of similar volatility are grouped together. The effect of this grouping is to minimize the relocation overhead, which occurs from relocating valid blocks, on subsequent erase operations. The relocation method uses a hierarchy of relocation criteria that are applied to the sectors in sectored EEPROM to determine their suitability of housing the relocated block. Most preferable in the relocation hierarchy is the relocation of the block in a sector having no obsolete blocks where the average sector volatility is within some predetermined threshold of the volatility of the block. The second preferred sector for relocation is the lowest addressed empty sector. The third most preferable location is the sector containing the least number of obsolete blocks where the average sector volatility is within some predetermined threshold of the volatility of the block. The relocation sector cannot be chosen to be the same as the sector to be erased. Finally, if none of the above preferred sectors are available, the block is relocated in the sector containing the fewest obsolete blocks. Again, the relocation sector cannot be the same as the sector to be erased. However, it should be noted that the number of the relocation criteria is not limiting. The actual relocation method may contain only some of the relocation criteria listed in the preferred embodiment. Additionally, while the disclosed embodiment presents the preferred hierarchy, the hierarchy of an actual implementation may differ due to other design considerations.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for reclaiming written sectors in sectored EEPROM, each sector comprising a plurality of sectored EEPROM blocks, comprising the steps:

defining a minimum relocatable block size equal to a sectored EEPROM page size;

defining a control information portion within each block containing status information of the block;

determining that an erase operation is to be performed on a sector to be reclaimed which contains at least one valid memory block and obsolete memory blocks;

calculating a volatility value of the valid memory blocks to be relocated using the status information;

relocating valid memory blocks from the sector to be reclaimed to other sectors using the calculated volatility value of the valid memory block to be relocated; and initiating an erase operation on the sector to be reclaimed.

2. The method of claim 1 wherein the status information contained in the control information comprises:

a block relocation count indicating the number of times the block has been relocated prior to an erase operation; and a block version number indicating the number of times the information within the block has been updated since its creation.

3. The method of claim 2 wherein the volatility value is calculated using the block relocation count and the block version number.

4. The method of claim 2 wherein the step of calculating the volatility value comprises:

defining an initial offset value; and setting volatility value equal to (block version number+ initial offset)/(block relocation count+1).

5. The method of claim 1 wherein the step of relocating the valid memory block comprises:

calculating an average volatility of each sector as the average of the volatility values of each valid block within the sector;

defining a first candidate sector as that sector whose average volatility is within a predetermined threshold of the volatility of the block to be relocated and that contains no obsolete blocks, said first candidate sector not the same as the sector to be reclaimed;

defining a second candidate sector as that sector containing the fewest obsolete blocks, said second candidate sector not the same as the sector to be reclaimed; and relocating said valid memory block within the first candidate sector if the first candidate sector exists within sectored EEPROM; else relocating said valid memory block within the second candidate sector.

6. The method of claim 1 wherein the step of relocating the valid memory block comprises:

calculating an average volatility of each sector as the average of the volatility values of each valid block within the sector;

defining a first candidate sector as that sector whose average volatility is within a predetermined threshold of the volatility of the block to be relocated and that contains no obsolete blocks, said first candidate sector not the same as the sector to be reclaimed;

defining a second candidate sector as the first empty sector following the sector to be reclaimed;

defining a third candidate sector as that sector containing the fewest obsolete blocks, said third candidate sector not the same as the sector to be reclaimed; and relocating the block within the first candidate sector if the first candidate sector exists within sectored EEPROM; else relocating the block within the second candidate sector if said second candidate sector exists within sectored EEPROM; else relocating the block within the third candidate sector.

7. The method of claim 1 wherein the step of relocating the valid memory block comprises:

calculating an average volatility of each sector as the average of the volatility values of each valid block within the sector;

defining a first candidate sector as that sector whose average volatility is within a predetermined threshold of the volatility of the block to be relocated and that contains no obsolete blocks, said first candidate sector not the same as the sector to be reclaimed;

defining a second candidate sector as the first empty sector following the sector to be reclaimed;

defining a third candidate sector as that sector containing the fewest obsolete blocks having an average volatility within the predetermined threshold value of the volatility of the block to be relocated, said third candidate sector not the same as the sector to be reclaimed;

defining a fourth candidate sector as that sector containing the fewest obsolete blocks, said fourth candidate sector not the same as the sector to be reclaimed; and relocating the block within the first candidate sector if the first candidate sector exists within sectored EEPROM; else relocating the block within the second candidate sector if said second candidate sector exists within sectored EEPROM; else relocating the block within the third candidate sector if said third candidate sector exists within sectored EEPROM; else relocating the block within the fourth candidate sector.

8. A method of relocating valid memory blocks from within a sectored EEPROM sector to be reclaimed comprising:

calculating a volatility of a block to be relocated using a block version number and a block relocation count stored within a control information of the block to be relocated;

calculating an average volatility of a sector as the average of the volatility of each valid block within the sector;

defining a hierarchy of candidate sectors based upon the average volatility of each sector, the volatility of the block to be relocated, and the contents of each sector; and relocating the block to an existing sector within sectored EEPROM based upon the hierarchy of candidate sectors.

9. The method of claim 8 wherein the hierarchy of candidate sectors comprises:

a first candidate sector having an average volatility within a predetermined threshold of the volatility of the block to be relocated and containing no obsolete blocks, said first candidate sector not the same as the sector to be reclaimed; and a second candidate sector containing the fewest obsolete blocks, said second candidate sector not the same as the sector to be reclaimed.

10. The method of claim 8 wherein the hierarchy of candidate sectors comprises:

a first candidate sector having an average volatility within a predetermined threshold of the volatility of the block to be relocated and containing no obsolete blocks, said first candidate sector not the same as the sector to be reclaimed;

a second candidate sector as the first empty sector following the sector to be reclaimed; and a third candidate sector containing the fewest obsolete blocks, said third candidate sector not the same as the sector to be reclaimed.

11. The method of claim 8 wherein the hierarchy of candidate sectors comprises:

a first candidate sector having an average volatility within a predetermined threshold of the volatility of the block to be relocated and containing no obsolete blocks, said first candidate sector not the same as the sector to be reclaimed;

a second candidate sector as the first empty sector following the sector to be reclaimed;

a third candidate sector containing the fewest obsolete blocks and having an average volatility within the predetermined threshold value of the volatility of the block to be relocated, said third candidate sector not the same as the sector to be reclaimed; and a fourth candidate sector as the sector containing the fewest obsolete blocks, said fourth candidate sector not the same as the sector to be reclaimed.

12. The method of claim 8 further comprising the step:

updating information in the control information of the relocated block.

13. The method of claim 12 wherein the step of updating information in the control information comprises:

incrementing the block version number by one; and incrementing the block relocation count by one.

* * * * *